No. 696,389. Patented Mar. 25, 1902.
H. BRYAN.
GANG PLOW.
(Application filed Sept. 6, 1901.)
(No Model.) 2 Sheets—Sheet 1.
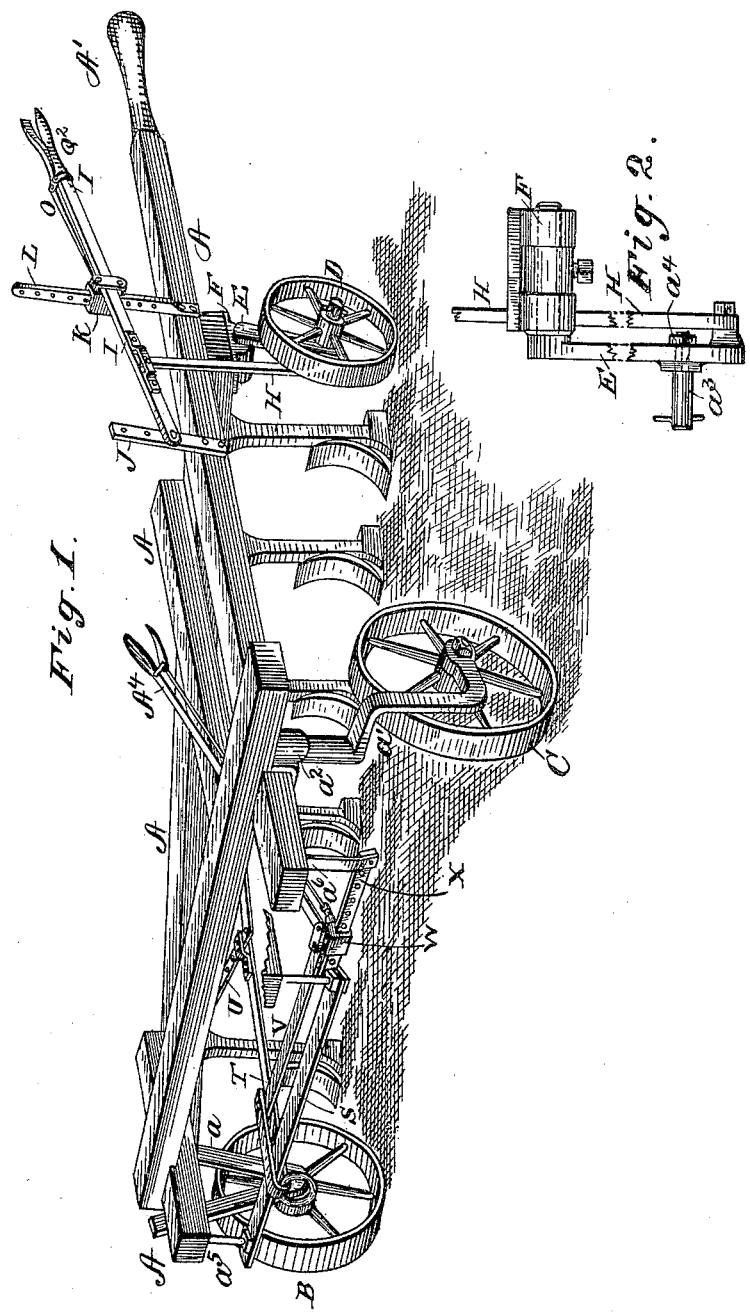
WITNESSES:
W. R. Edelen.
Amos W. Hart
INVENTOR
Henry Bryan.
BY Munn & Co.
ATTORNEYS No. 696,389. Patented Mar. 25, 1902.
H. BRYAN.
GANG PLOW.
(Application filed Sept. 6, 1901.)
(No Model.) 2 Sheets—Sheet 2.

WITNESSES:
W. R. Edelen,
Ann W. Hart

INVENTOR
Henry Bryan
BY Munn & Co.
ATTORNEYS

UNITED STATES PATENT OFFICE.

HENRY BRYAN, OF MODESTO, CALIFORNIA.

GANG-PLOW.

SPECIFICATION forming part of Letters Patent No. 696,389, dated March 25, 1902.

Application filed September 6, 1901. Serial No. 74,480. (No model.)

*To all whom it may concern:*

Be it known that I, HENRY BRYAN, a citizen of the United States, residing at Modesto, in the county of Stanislaus and State of California, have made certain new and useful Improvements in Gang-Plows, of which the following is a specification.

My invention is an improvement in a class of gang-plows having a draft attachment adapted to be shifted laterally for the purpose of guiding the plow or changing its course as a whole. In this class of plows the problem has been to provide a draft attachment which could be securely locked in any adjustment and yet possess due strength and durability without too great weight of parts. I have devised a superior combination and arrangement of parts for effecting this result.

The details of construction, combination, and arrangement of parts are as hereinafter described, reference being had to accompanying drawings, in which—

Figure 4:
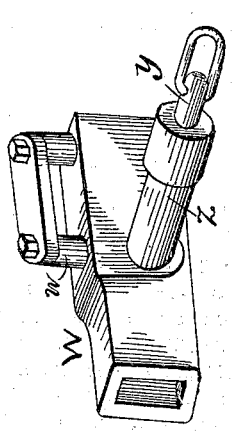
Figure 5:
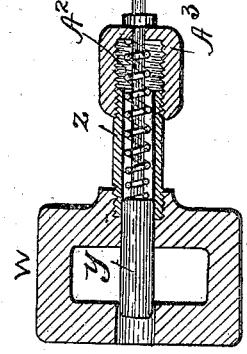
Figure 6:
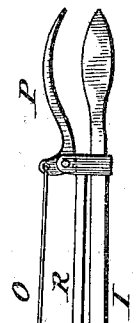
Figure 3:
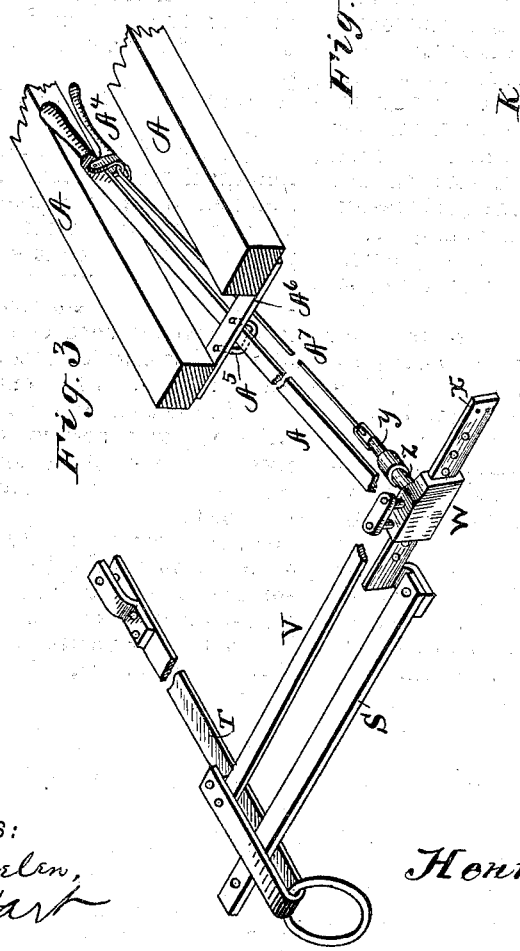

Figure 1 is a perspective view of the plow as a whole, a portion of one of the beams being broken away to show a portion of the draft attachment. Fig. 2 is a detail view illustrating the means for adjusting the height of the rear end of the plow-frame. Fig. 3 is a perspective view, parts being in section, illustrating the draft attachment proper. Fig. 4 is a perspective view of a sleeve or slidable casting forming a part of the draft attachment. Fig. 5 is an enlarged cross-section of the same. Fig. 6 is a view illustrating the lever mechanism for adjusting the height of the rear end of the plow-frame.

Referring in the first instance particularly to Fig. 1, A indicates a frame composed of a series of wooden bars rigidly connected, the whole having substantially a triangular form and the rear portion provided with a handle A' for use in adjusting the plow manually, as occasion may require. The said frame carries a series of plows arranged in gang and suitably attached to pendent standards or stops. The frame is supported by three broad-tread running-wheels B C D, which are arranged at the respective corners of the same. The wheel B is mounted upon a fixed axle or journal attached to a bracket $a$. The wheel C is attached to a bent arm $a'$, journaled in a socket $a^2$, whereby the wheel C is adapted to "track" or serve as a caster-wheel. The wheel D is mounted on a stub-axle $A^3$, carried by a crank-arm E and secured by a nut $a^4$. The journal of said arm E is held in bearings F, between which is a clamp-collar. The arm E is connected by a bar H with a lever I, which is pivoted to a vertical bar J and adjustably connected with another vertical bar L by means of a sleeve K, having a locking-pin M. The said pin is operated by a rod O and a lever P. (See Fig. 6.) The mechanism here described for adjusting the height of the rear end of the frame has been made the subject of an application for patent, No. 91,584.

I will now describe my invention, the shiftable draft attachment. As shown in Fig. 1, a horizontal bar S is rigidly connected with the front portion of the frame A by means of pendent rods or brackets $a^5$. The draft-bar proper, T, is supported slidably at its front end on this bar S and pivoted at its rear end to a bracket U, secured to the frame A. The front end of said bar T is provided with a loop that embraces the supporting-bar S and is provided with a ring for convenience of attachment of a doubletree. A bar V is arranged in rear of the supporting-bar S and connects the draft or clevis bar T with a slidable casting or sleeve W, which is mounted upon a horizontal rack-bar X. The said rack-bar is supported at its outer end by a pendent arm $a^6$, and at its inner end it is rigidly connected with the bar S, before described. It is thus practically in the same horizontal plane with the bar S, but slightly in rear thereof. The sleeve or casting W is adapted to slide on the rack-bar S and to be locked therewith by means substantially similar to those already described in connection with the rear lever I. A pin Y (see Figs. 4 and 5) is adapted to slide in a tube Z, forming a fixed attachment of the sleeve W. A spiral spring $A^2$ is arranged in the tube between a shoulder of the pin and the screw-cap $A^3$ applied to the tube, as shown. It is obvious that the spring $A^2$ will hold the pin normally engaged with the rack-bar X and that by retracting said pin against the tension of the spring the lock will be released, and the sleeve W may be shifted on the rack-bar as required. It is further apparent that since the sleeve W is connected with the draft or clevis bar T by means of a rod V the said draft-bar will be shifted with the sleeve and that by such adjustment the course of the plow may be changed at will from right to left, as required, when the plow is being hauled from one point to another or for the purpose of causing the plow proper to make furrows of greater or less width. For the purpose of shifting the sleeve or casting W on the rack-bar X, I employ a lever $A^4$, which is pivoted on a stud $w$, forming part of the sleeve (see Fig. 4) and projects rearward and upward, being supported and fulcrumed in a keeper $A^5$, (see Fig. 3,) attached to a bar $a^6$, which is secured to the under side of the frame A. By this means the lever $A^4$ is adapted to slide freely in its fulcrum to accommodate the different positions or adjustments of the sleeve W. For the purpose of retracting the locking-pin Y, I employ the rod $A^7$ and small elbow-lever $A^8$, (see Fig. 3,) which are arranged in a well-known manner. It will be seen that while the parts forming this improved draft attachment are few in number and the weight of the same is inconsiderable the adjustment of the same may be made with facility, and the lock is perfectly secure.

What I claim is—

1. In a plow of the class described, the combination with a frame, of a laterally-shiftable draft-bar, a rack-bar arranged horizontally, a sleeve adapted to slide on said rack-bar, means for connecting the said sleeve with the draft-bar, and means for locking the sleeve in any required adjustment.

2. In a plow of the class described, the combination with a frame, of a pivoted draft-bar, a rack-bar arranged laterally therefrom and supported rigidly beneath the frame, a sleeve adapted to slide on said rack-bar and connected with the draft-bar, and means for shifting the sleeve and locking it, substantially as shown and described.

3. In a plow of the class described, the combination with a frame, supporting-wheels, and the draft-bar adapted to shift laterally, of a rack-bar and the sleeve, adapted to slide thereon, and connected with the said draft-bar, a spring-pressed pin forming an attachment of said sleeve and adapted to lock the latter with the rack-bar, a lever, pivotally connected with the sleeve and fulcrumed on the frame and having means for retracting the pin for releasing the lock, substantially as shown and described.

4. In a plow of the class described, the combination with a wheel-frame, and a draft-bar pivoted and adapted to be shifted laterally, a rack-bar arranged laterally therefrom and in a horizontal plane, a device which is slidable thereon, means for connecting with the draft-bar whereby the two move together when shifted laterally, and means for shifting and locking the said device, as and for the purpose specified.

5. In a plow of the class described, the combination with the wheel-frame, and the draft-bar which is pivoted at its rear end and supported at its front end, of a fixed rack-bar arranged practically in the same horizontal plane, a sleeve or casting adapted to slide on the said rack-bar, and the bar connecting said sleeve with the draft-bar, whereby the same are shifted together laterally, a slidable pin and a spring arranged in an attachment of the sleeve and adapted to press the pin forward, to hold it normally engaged with the rack-bar, a lever pivoted to said sleeve and extending rearward and upward, a keeper constituting a support and fulcrum for the lever wherein it is adapted for sliding and lateral movement corresponding to the adjustment of the sleeve, and means connected with said lever, for retracting the locking-pin, substantially as shown and described.

6. In a plow of the class described, the combination with a wheeled frame, a shiftable draft-bar, and a fixed rack-bar, of a casting or sleeve which is slidable on the latter and provided with studs as described, a pitman rod or bar connected with the draft-bar and pivoted on one of said studs, a lever pivoted on the adjacent stud and fulcrumed in the frame, and means for locking the sleeve in any adjustment, substantially as shown and described.

HENRY BRYAN.

Witnesses:
G. R. STODDORD,
CHAS. E. RICE.